US009886979B1

(12) United States Patent
Galbraith et al.

(10) Patent No.: US 9,886,979 B1

(45) Date of Patent: Feb. 6, 2018

(54) IMPLEMENTING BER-LIST MODULATION CODE FOR HARD DISK DRIVES

(71) Applicant: Western Digital Technologies, Inc., San Jose, CA (US)

(72) Inventors: Richard Leo Galbraith, Rochester, MN (US); Weldon Mark Hanson, Rochester, MN (US); Iouri Oboukhov, Rochester, MN (US); Gary William Walker, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/395,150

(22) Filed: Dec. 30, 2016

(51) Int. Cl.
*G11B 5/02* (2006.01)
*G11B 20/18* (2006.01)

(52) U.S. Cl.
CPC .................................... *G11B 20/18* (2013.01)

(58) Field of Classification Search
CPC ..... G11B 5/012; G11B 27/36; G11B 5/59688; G11B 27/3027; G11B 2220/90; H04L 27/2647; H04L 1/003; H04L 5/007; H04L 27/2092; H04L 27/2071; H04L 27/04; H04L 27/22; H04L 27/2332; H03M 13/09; H03M 13/2957; H03M 13/29; G06F 11/01
USPC ......... 369/59.11; 360/25, 29, 31, 39, 40, 48; 375/316, 295, 302, 309, 329, 341; 714/758, 801, 755
See application file for complete search history.

(56) References Cited

U.S. PATENT DOCUMENTS

| | | | | |
|---|---|---|---|---|
| 7,000,168 B2 * | 2/2006 | Kurtas | H03M 13/05 714/755 |
| 7,567,400 B2 | 7/2009 | Cheng | |
| 8,085,640 B2 * | 12/2011 | Minemura | G11B 20/10009 369/59.11 |
| 8,402,345 B1 | 3/2013 | Yang et al. | |
| 8,489,977 B2 | 7/2013 | Vamica et al. | |
| 8,583,981 B2 | 11/2013 | Vamica et al. | |
| 9,148,177 B2 | 9/2015 | Arikan | |
| 9,231,622 B2 | 1/2016 | Wang | |
| 2003/0043939 A1 * | 3/2003 | Okumura | G11B 7/094 375/341 |
| 2015/0067415 A1 * | 3/2015 | Miyamoto | G06F 11/073 714/704 |

FOREIGN PATENT DOCUMENTS

| | | |
|---|---|---|
| WO | 2004039089 A2 | 5/2004 |
| WO | 2007084751 A2 | 7/2007 |

OTHER PUBLICATIONS

Link Budget Analysis: Error Control & Detection, ARF Atlanta RF Services, Software & Designs, pp. 1-63, Aug. 2013 http://atlantarf.com/Error_Control.php.

* cited by examiner

*Primary Examiner* — Nabil Hindi

(74) *Attorney, Agent, or Firm* — Patterson + Sheridan, LLP

(57) ABSTRACT

A method, apparatus, and system are provided for implementing an enhanced modulation code for hard disk drives (HDDs). A modulation code directly uses Bit Error Rate (BER) information for different user patterns to construct a coded word minimizing possible error rate. The modulation code has a flexible code rate that simplifies code optimization relative to Coded Bit Density (CBD), signal to noise ratio (SNR) and noise color.

8 Claims, 5 Drawing Sheets

IMPLEMENTING BER-LIST MODULATION CODE FOR HARD DISK DRIVES

Field of the Invention

The present invention relates generally to the data storage field, and more particularly, relates to a method, apparatus, and system for implementing an enhanced modulation code using a Bit Error Rate (BER) list in hard disk drives (HDDs).

Description of the Related Art

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Modulation code typically is a first stage of the Read Channel in hard disk drives (HDDs). The modulation code is responsible for data dependent encoding of user data before writing to the hard disk drive (HDD). Typically modulation code includes information about bad patterns for user data and to encode user data to avoid these patterns.

The traditional examples of such bad patterns are non-transition patterns, all zeros or all ones, that make difficult data clock recovery. A solution to avoid such error is a Run Length Limit (RLL) modulation code that limit distance between two transitions. Another example is a transition noise. Because of a grain nature of writing media, typically, the noise of HDD signal near transition is bigger than in the region between transitions. Therefore the patterns with higher number of transitions, such as 10101, have more errors. The solution for this problem is encoding of the user data to reduce the transition number by a Maximum Transition Rate (MTR) modulation code. There are a few other known constraints and number of modulation codes that handle such constraints. Nevertheless there are cases where the number of constraints is large or the constraints are not quite obvious. In this case construction of code that will have best performance is difficult.

A need exists for effective mechanism for implementing an enhanced modulation code for hard disk drives (HDDs).

SUMMARY OF THE INVENTION

Aspects of the preferred embodiments are to provide a method, apparatus, and system for implementing an enhanced modulation code in hard disk drives (HDDs). Other important aspects of the preferred embodiments are to provide such method, apparatus, and system substantially without negative effect and to overcome some of the disadvantages of prior art arrangements.

In brief, a method, apparatus, and system are provided for implementing an enhanced modulation code for hard disk drives (HDDs). A modulation code directly uses Bit Error Rate (BER) information for different user patterns to construct a coded word minimizing possible error rate.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing enhanced an enhanced modulation code for hard disk drives (HDDs).

Figure 1:
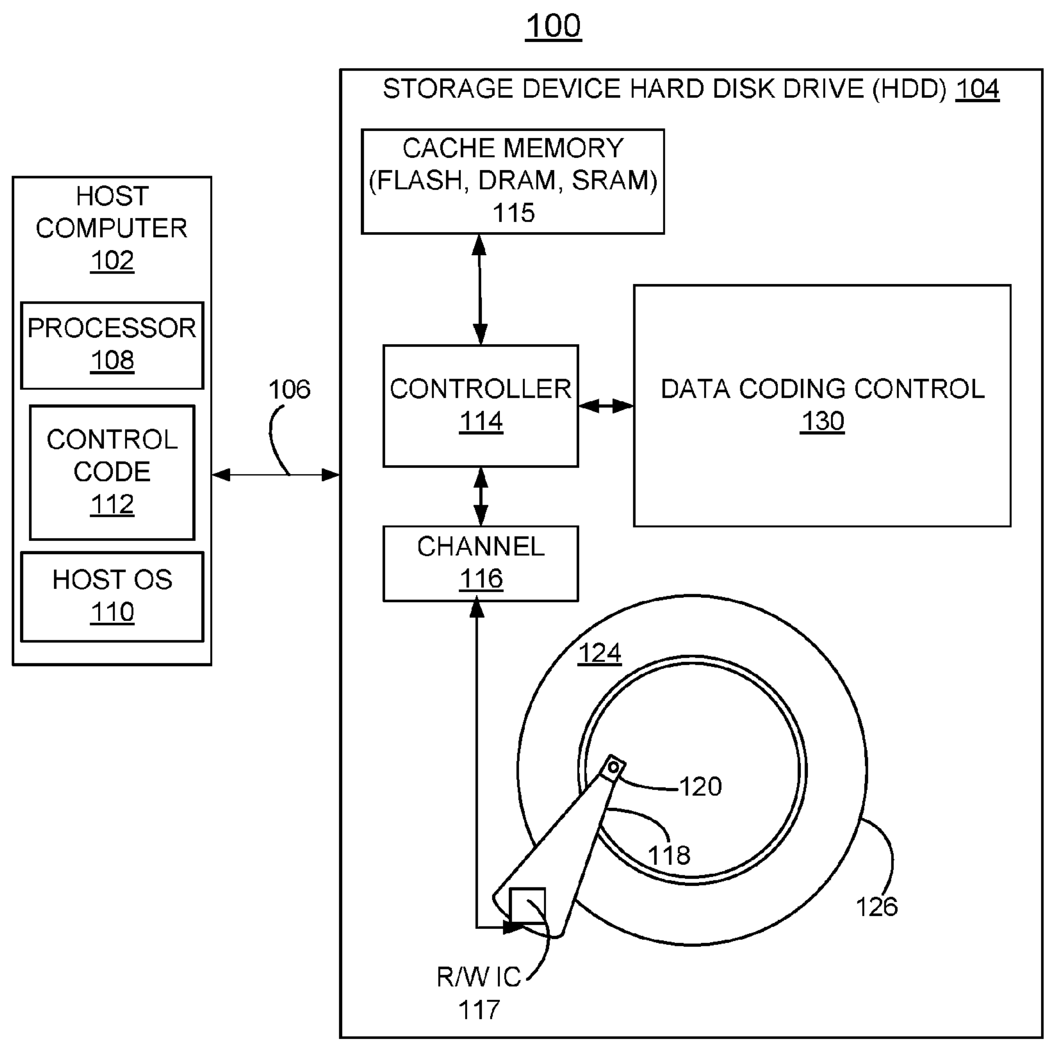
FIG. 1 is a block diagram representation illustrating a system for implementing an enhanced modulation code for hard disk drives (HDDs)in accordance with preferred embodiments.

Having reference now to the drawings, in FIG. 1, there is shown an example system generally designated by the reference character 100 for implementing enhanced an enhanced modulation code for hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or HDD 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing servo circuitry for track following using signal asymmetry metrics monitored during read back. The storage device or hard disk drive 104 includes an arm 118 carrying a slider 120 for in accordance with preferred embodiments. The slider 120 flies over a writable disk surface 124 of a disk 126 and includes a read sensor integrated with the slider 120.

In accordance with features of preferred embodiments, data coding control 130 is provided with the controller 114 to implement an enhanced modulation code for hard disk drives (HDDs) for encoding sector block words for minimizing possible error rate.

System 100 including the host computer 102 and the HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

Figure 2:
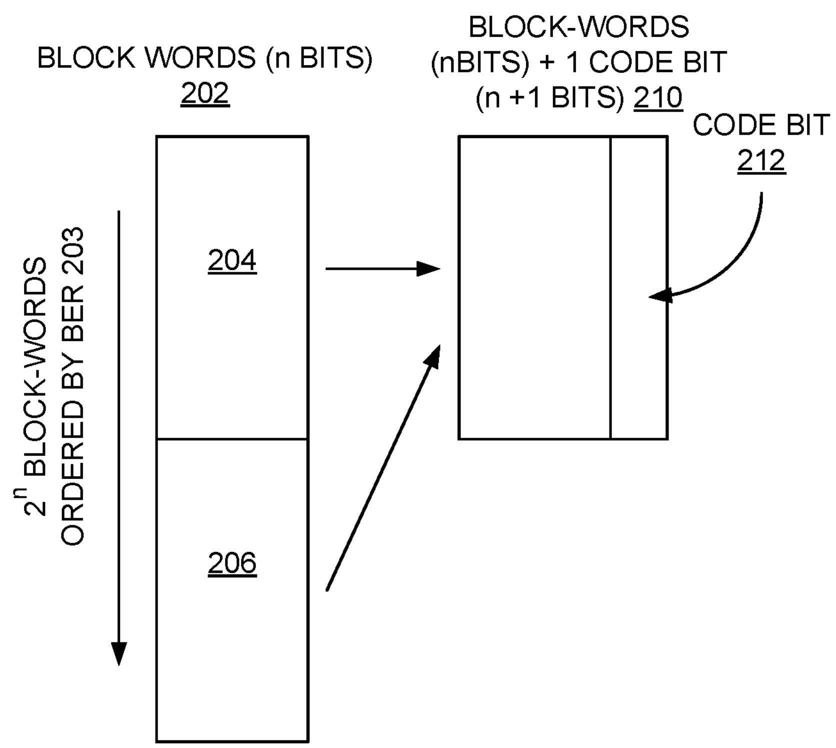
FIG. 2 schematically illustrates an example modulation code stage directly using Bit Error Rate (BER) information in hard disk drives (HDDs) in accordance with preferred embodiments.

Referring now FIG. 2, there is shown schematically illustrates an example modulation code stage generally designated by the reference character 200 directly using Bit Error Rate (BER) information in hard disk drives (HDDs) in accordance with preferred embodiments. Modulation code stage 200 is used, for example to encode a user sector using block-word encoding based upon finding the BER for all possible n-bit blocks where there are $2^n$ options and the block-words are ordered or sorted by BER providing BER list 203. Modulation code stage 200 includes a BER-list 203 including n-bit patterns or block-words (n-bits in length) 202 ordered by Bit Error Rate (BER). BER list 203 includes two-equivalent regions, an upper region 204, and a bottom region 206. Using the BER-list 203, rules are constructed to encode the user block-word that reduces BER of the block-word and satisfy one or more useful properties.

Modulation code stage 200 includes encoded block-words (n+1 bits) 210 including 1 code bit 212 that are generated with n→n+1 encoding. For a user block-word having large BER weight in the bottom region 206, then this block-word is replaced by a code-word from top region 204. The encoding can be implemented by taking the index of user block-word in BER-list 203, subtract half of BER-list length (index shift), and placing the code-word corresponding to new index as a coded block-word. After that a single bit 212 set as 1 (coding bit) is added to block-word, meaning that index shift was done. For a user block-word is in the top region 204 of BER-list, the block-word is not changed and the coding bit 212 is set to 0, meaning that index shift was not done. After such encoding all block-words are in the top region 204 of BER-list 203 and total BER of the pattern are reduced. The main disadvantage of this simplest encoding of modulation code stage 200 is high penalty of a code 1/(n+1). To create the code with penalty 1% we need to use code word blocks with n equal to approximately 100 and the BER list 203 of $2^n$ block words is too long $2^n$ for practical applications.

Figure 3:
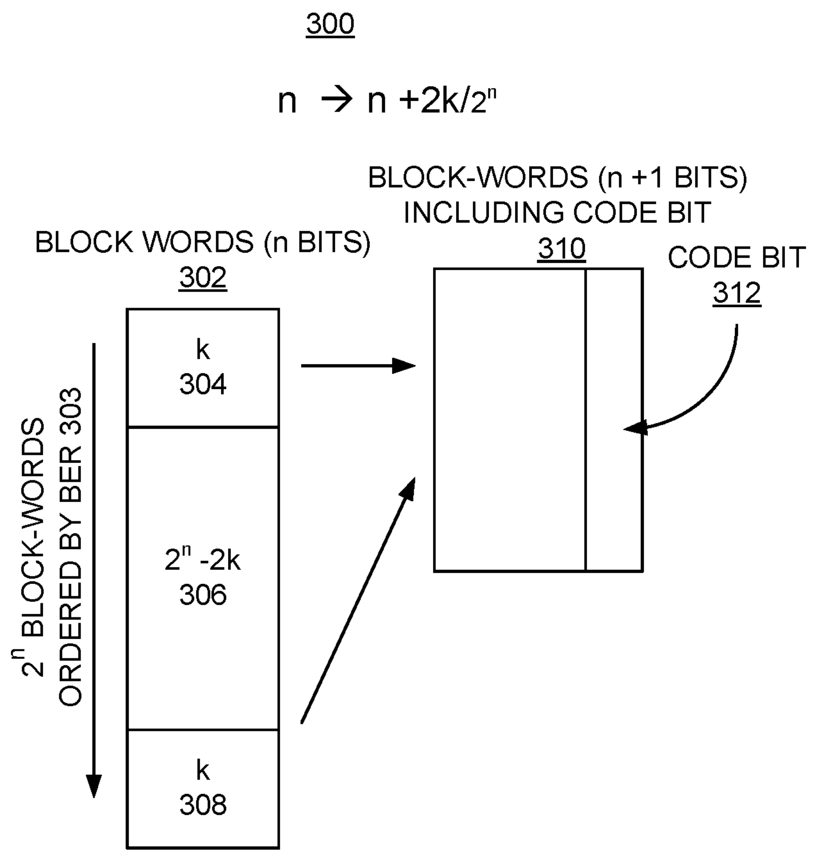
FIG. 3 schematically illustrates another example modulation code stage directly using Bit Error Rate (BER) information in hard disk drives (HDDs) in accordance with preferred embodiments.

Referring to FIG. 3, there is schematically shown another example modulation code stage generally designated by the reference character 300 directly using Bit Error Rate (BER) information in hard disk drives (HDDs) in accordance with preferred embodiments. Modulation code stage 300 includes a block word length of n bits and generates of a list of $2^n$ block words of the sector ordered by Bit Error Rate (BER) or BER list 303. The list of block words 302 ordered by Bit Error Rate (BER) 303 includes a upper best code word range 304 k, a central code word range 306 $2^n$ less 2 k and a lower worst code word range 308 k. Modulation code stage 300 constructs encoded block words (n+1 bits) 310 including a code bit 312.

For the encoding of modulation code stage 300, if a user block-word has BER in the range 308 of worst k block-words, this block-word is encoded that place it in the range 304 of best k code-words and the coding bit 312 is set as 1. If user code-word is in the range 304 of best k code-words, the block word is not changed and coding bit set as 0. If user block-word is in the range 306 of BER list 303 from k+1 to $2^n-k$ the code-word is not changed and no coding bit is written. On average, the encoding n is represented by $n \rightarrow n+2k/2^n$ encoding. The main problem of this approach that coding rate is variable, depending on data.

Figure 4:
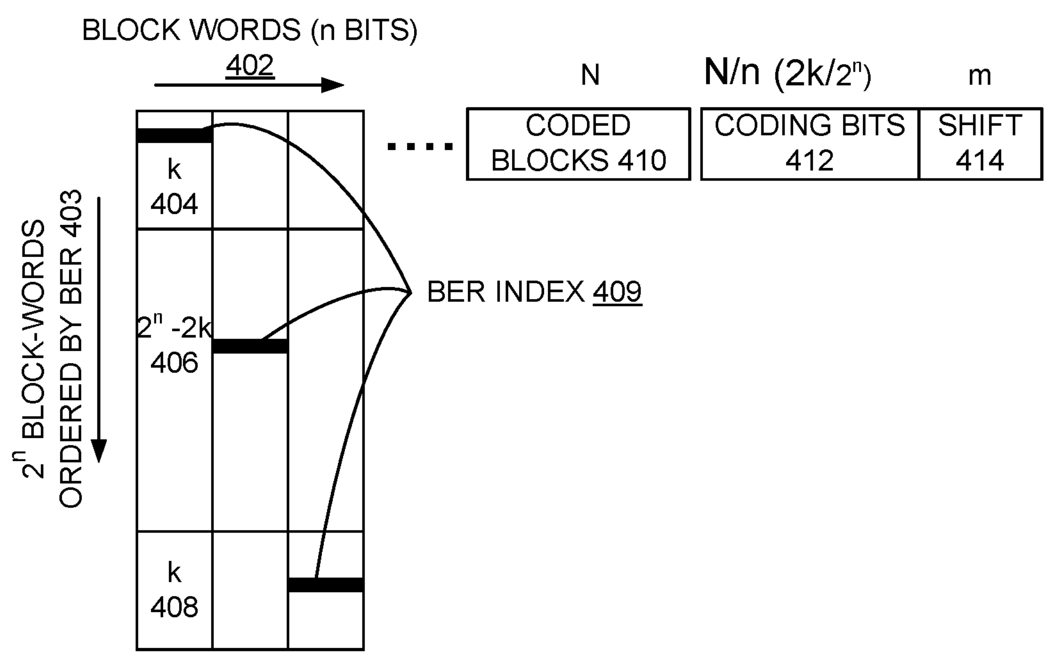
FIG. 4 schematically illustrates another example modulation code stage directly using Bit Error Rate (BER) information including block-word index shift in hard disk drives (HDDs) in accordance with preferred embodiments.

In accordance with features of preferred embodiments, data coding control 130 provided with the controller 114 implements an enhanced modulation code for hard disk drives (HDDs) for encoding sector block words minimizing possible error rate and providing a constant coding rate as illustrated in FIG. 4.

Referring to FIG. 4, there is schematically shown another example modulation code stage generally designated by the reference character 400 directly using Bit Error Rate (BER) information including block-word index shift in accordance with preferred embodiments. Modulation code stage 400 includes a block word length of n bits and generates of a list of $2^n$ block words of the sector ordered by Bit Error Rate (BER) 403. The Bit Error Rate (BER) ordered list 403 of block words 402 includes an upper best code word range 404 k, a central code word range 406 $2^n$ less 2 k, and a lower worst code word range 408 k. Modulation code stage 400 constructs coded block words N 410 including constant code rate coding bits 412 represented by N/n ($2k/2^n$) coding bits, where N represents coded sector blocks with a block word length of n bits, a upper best code word range k, a lower worst code word range k, and a central code word range $2^n$ less 2 k, where the ordered BER list 403 includes $2^n$ block words ordered by Bit Error Rate (BER), and a shift index m, 414.

For encoding of a sector with modulation code stage 400, first the sector of length N, 410 is divided into n-bits block-words or ~N/n block-words. A representative position or index 409 of each block-word in BER-list 403 is schematically shown by solid blocks 409 in FIG. 4. The average number of sector block-words in the encoded BER-list region 404 and 408 is approximately $N/k*2k/2^n$. Nevertheless the number of sector block-words, which need encoding, statistically could be bigger. To resolve this we introduce one more encoding operation for encoding sector block-words 410. Simultaneously the indices of sector block-words are changed by shift index 414 m. This corresponds to a circular shift of matrix in FIG. 4 in the vertical direction. There are $2^n$ possible circular shifts. After that some sector block-words are moved out of the encoding zone, some move in. Statistically half of the shift values will lead to situation when the number of sector block-words which need encoding, will be less than average $\sim N/n*2k/2^n$. In the other half the number of sector block-words, which need encoding will be bigger. Therefore finding the circular shift m, 414 transforms sector block-words in such way that $\sim N/n*2k/2^n$ coding bits are enough for encoding. To memorize the value of circular shift we need extra m bits. Operation of the circular shift gives additional flexibility to BER optimization of encoded sector. Check all possible shifts optionally is used to find the best.

Finally, the encoded sector as shown in FIG. 4 results from writing N/n sector block-words 410, $N/n*2k/2^n$ bits for block-word encoding bits 412 and m-bit shift 414. If N not commensurate with n, the remnant bits will not be encoded.

In accordance with features of the preferred embodiments, the example of BER-list encoding is practical for block-word length n=7-15 bits. A main advantage of BER-list codes is natural incorporation of BER information in code construction. From this point of view this code is universal for any combination of error inducing events. The rate of the code is extremely flexible that simplify code rate optimization for different signal to noise ratio (SNR), user bit density (UBD) and noise color.

Figure 5:
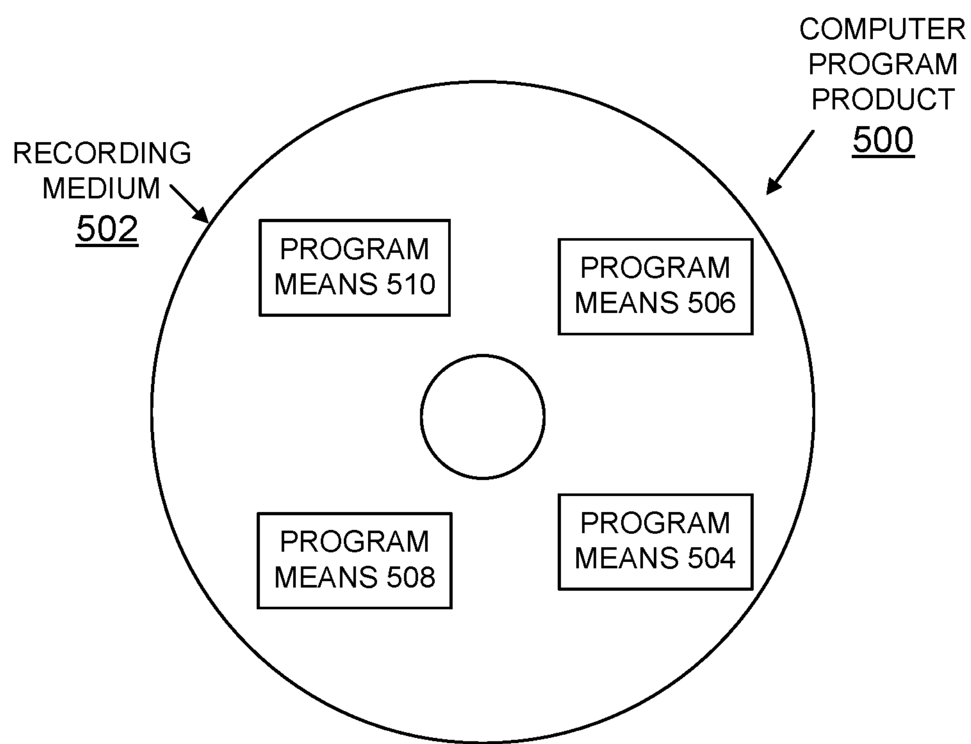
FIG. 5 is a block diagram illustrating a computer program product in accordance with preferred embodiments.

Referring now to FIG. 5, an article of manufacture or a computer program product 500 of the preferred embodiments is illustrated. The computer program product 500 includes a computer readable recording medium 502, such as, a floppy disk, a high capacity read only memory in the form of an optically read compact disk or CD-ROM, a tape, or another similar computer program product. Computer readable recording medium 502 stores program means or control code 504, 506, 508, 510 on the medium 502 for carrying out the methods for implementing modulation codes in HDDs in accordance with preferred embodiments in the system 100 of FIG. 1.

A sequence of program instructions or a logical assembly of one or more interrelated modules defined by the recorded program means or control code 504, 506, 508, 510, direct HDD controller 114 to implement modulation codes in HDDs of preferred embodiments.

While the present invention has been described with reference to the details of the embodiments of the invention shown in the drawing, these details are not intended to limit the scope of the invention as claimed in the appended claims.

What is claimed is:

1. A method for implementing an enhanced modulation code for hard disk drives (HDDs) including a controller for data coding control, said method comprising:

generating a list of block words of a sector ordered by Bit Error Rate (BER); and constructing a coded block word for different user patterns using the list and an BER index with coding bits represented by N/n ($2k/2^n$) coding bits, where N represents coded sector blocks with a block word length of n bits, a upper best code word range k, a lower worst code word range k, and a central code word range $2^n$ less 2k, where the list includes $2^n$ block words ordered by Bit Error Rate (BER).

2. The method of claim 1, wherein the BER index represents a position of each block word in the list.

3. An apparatus for implementing an enhanced modulation code for hard disk drives (HDDs), comprising:

a controller; and at least one disk; said disk including a disk media including written data tracks for storing data;

wherein:

said controller is configured to generate a list of block words of a sector ordered by Bit Error Rate (BER); and said controller is further configured to construct a coded block word for different user patterns using the list and an BER index with coding bits represented by N/n ($2k/2^n$) coding bits, where N represents coded sector block with a block word length of n bits, a upper best code word range k, a lower worst code word range k, and a central code word range $2^n$ less 2k, and the list includes $2^n$ block words ordered by Bit Error Rate (BER).

4. The apparatus of claim 3, includes further comprising control code stored on a non-transitory computer readable medium, and wherein said controller is further configured to use said control code for generating the enhanced modulation code for hard disk drives (HDDs).

5. The apparatus of claim 3, wherein the BER index represents a position of each block word in the list.

6. A system for implementing an enhanced modulation code for hard disk drives (HDDs), comprising:

a hard disk drive (HDD), said HDD comprising a controller and at least one disk, said disk including a disk media including written data tracks for storing data;

wherein:

said controller is configured to generate a list of block words of a sector ordered by Bit Error Rate (BER); and said controller is further configured to use a modulation code for encoding sector block words using the list and an BER index with encoding coding bits represented by N/n ($2k/2^n$) coding bits, where N represents coded sector block with a block word length of n bits, a upper best code word range k, a lower worst code word range k, and a central code word range of $2^n$-2k, and the list includes $2^n$ block words ordered by Bit Error Rate (BER).

7. The system of claim 6, further comprising control code stored on a non-transitory computer readable medium, and wherein said controller is further configured to use said control code for generating the enhanced modulation code for hard disk drives (HDDs).

8. The system of claim 6, wherein the BER index represents a position of each block word in the list.

* * * * *